United States Patent [19]

Peterson et al.

[11] 4,094,633

[45] June 13, 1978

[54] GRANULAR BED ROASTER CONSTRUCTION

[75] Inventors: Don G. Peterson, Frisco; Judson M. Harper, Fort Collins, both of Colo.

[73] Assignee: Food Processes, Inc., Saginaw, Mich.

[21] Appl. No.: 695,826

[22] Filed: Jun. 14, 1976

[51] Int. Cl.$^2$ .......................... F27B 7/14; F27B 15/00
[52] U.S. Cl. ................................. 432/118; 99/323.9; 426/469; 432/197; 432/215
[58] Field of Search ................... 432/118, 197, 215; 426/469, 294; 99/323.9

[56] References Cited

U.S. PATENT DOCUMENTS

| 1,731,457 | 10/1929 | Fasting | 432/215 |
| 2,443,620 | 6/1948 | Hubbard | 432/118 |
| 2,683,594 | 7/1954 | Martenson et al. | 432/118 |
| 2,754,105 | 7/1956 | Pistorius et al. | 432/215 |
| 2,872,386 | 2/1959 | Aspegren | 165/88 X |
| 3,253,533 | 5/1966 | Benson | 99/404 |
| 3,578,417 | 5/1971 | Dale | 432/197 |
| 3,746,546 | 7/1973 | Bateson et al. | 99/323.9 |

Primary Examiner—John J. Camby

Attorney, Agent, or Firm—Williamson, Bains, Moore & Hansen

[57] ABSTRACT

Methods and apparatus for roasting a product with a heated granular bed are disclosed. A granular bedding, heat transfer material such as salt or the like contained within a rotatable heating chamber is directly exposed to a heat source which directs heat into the interior of the heating chamber. Heated granular material is then conveyed to a separate product roasting chamber and mixed with incoming particles of a product to be roasted. Internally disposed auger and flighting means facilitate movement of the commingled granular material and product through the roasting bin in response to rotation thereof. Separation means at the output of the roasting bin separates the processed product from the granular heating medium, and continuously returns the granular material to the heating bin for repetition of the process cycle. In one form of the invention the heating chamber is coaxially disposed internally of the rotatable roasting chamber to maximize thermal efficiency. In an alternative embodiment, commingled product and granular material are heated together in a rotatable chamber.

7 Claims, 7 Drawing Figures

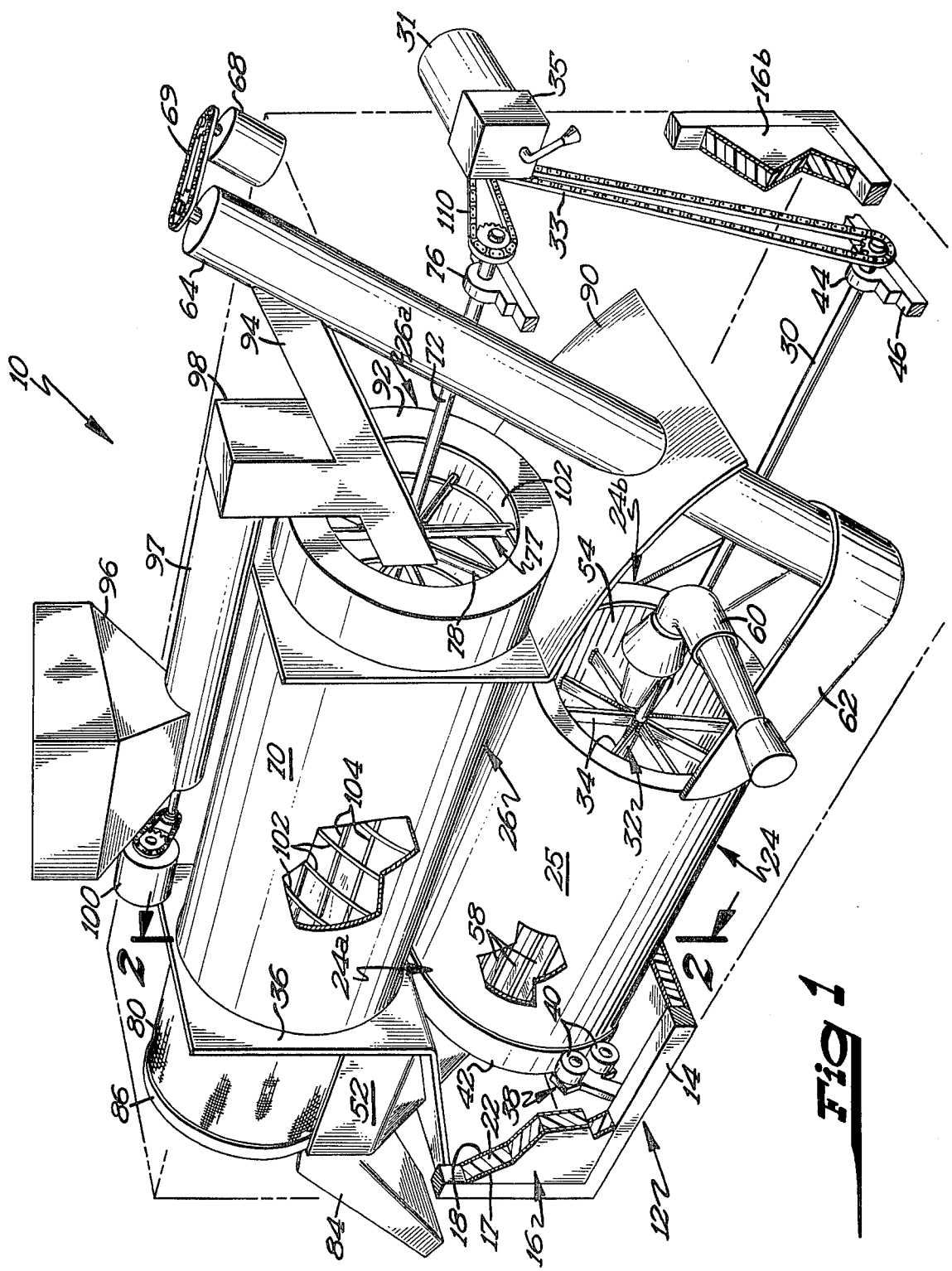

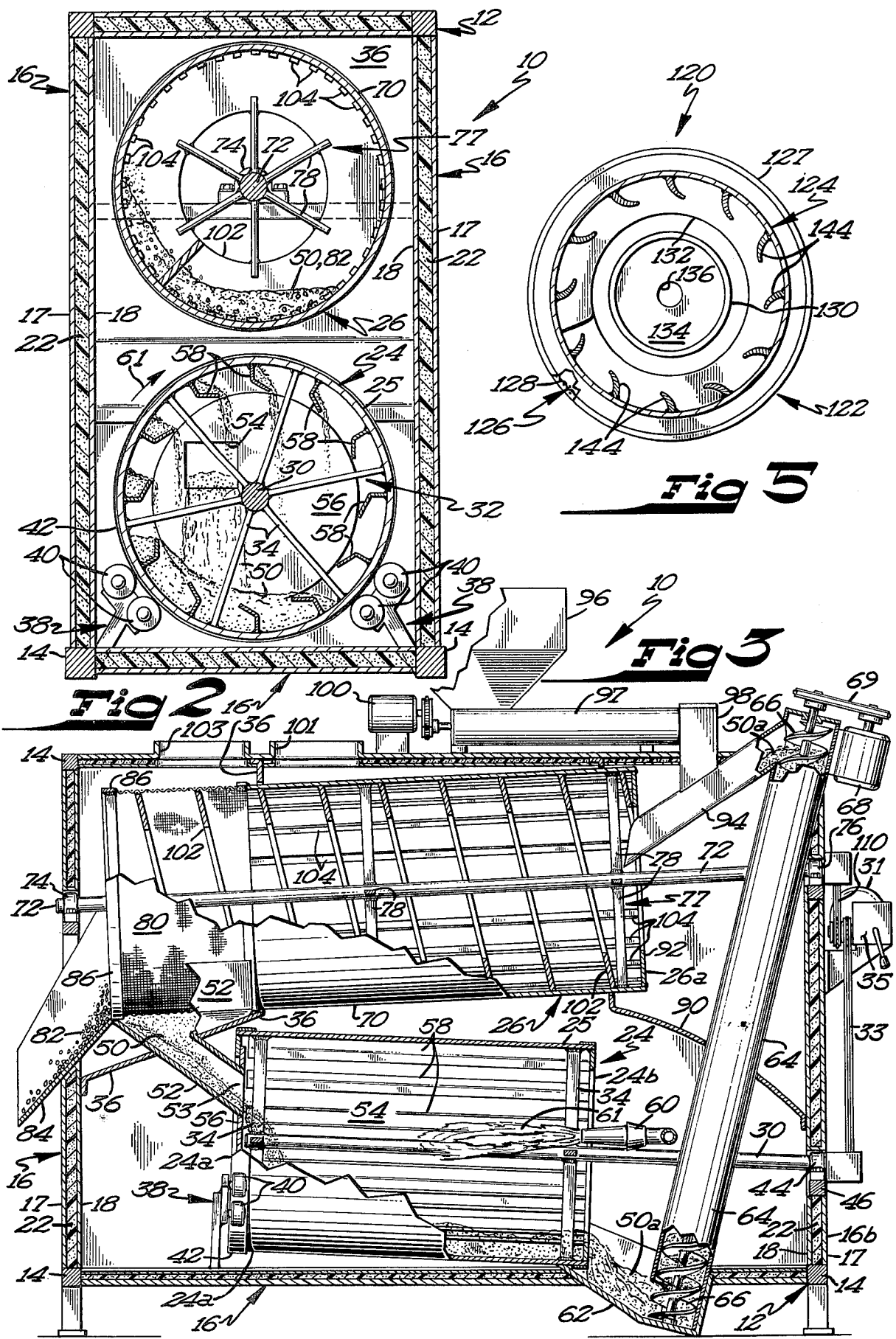

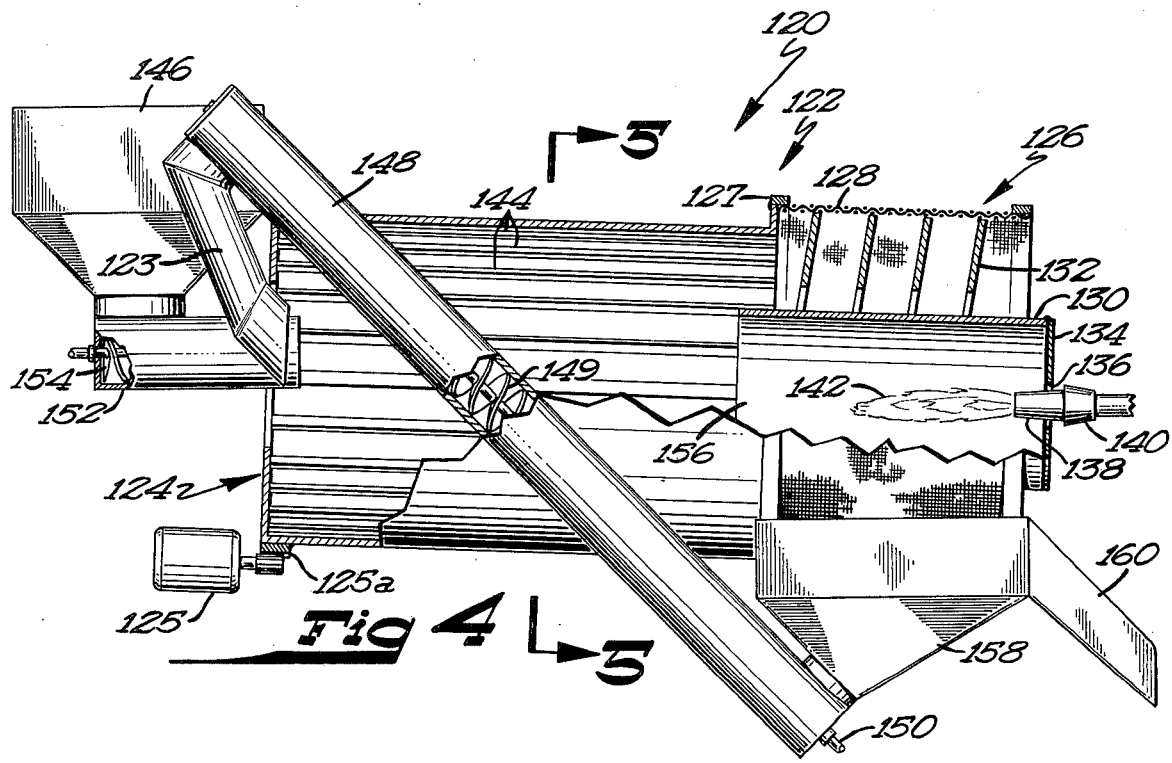
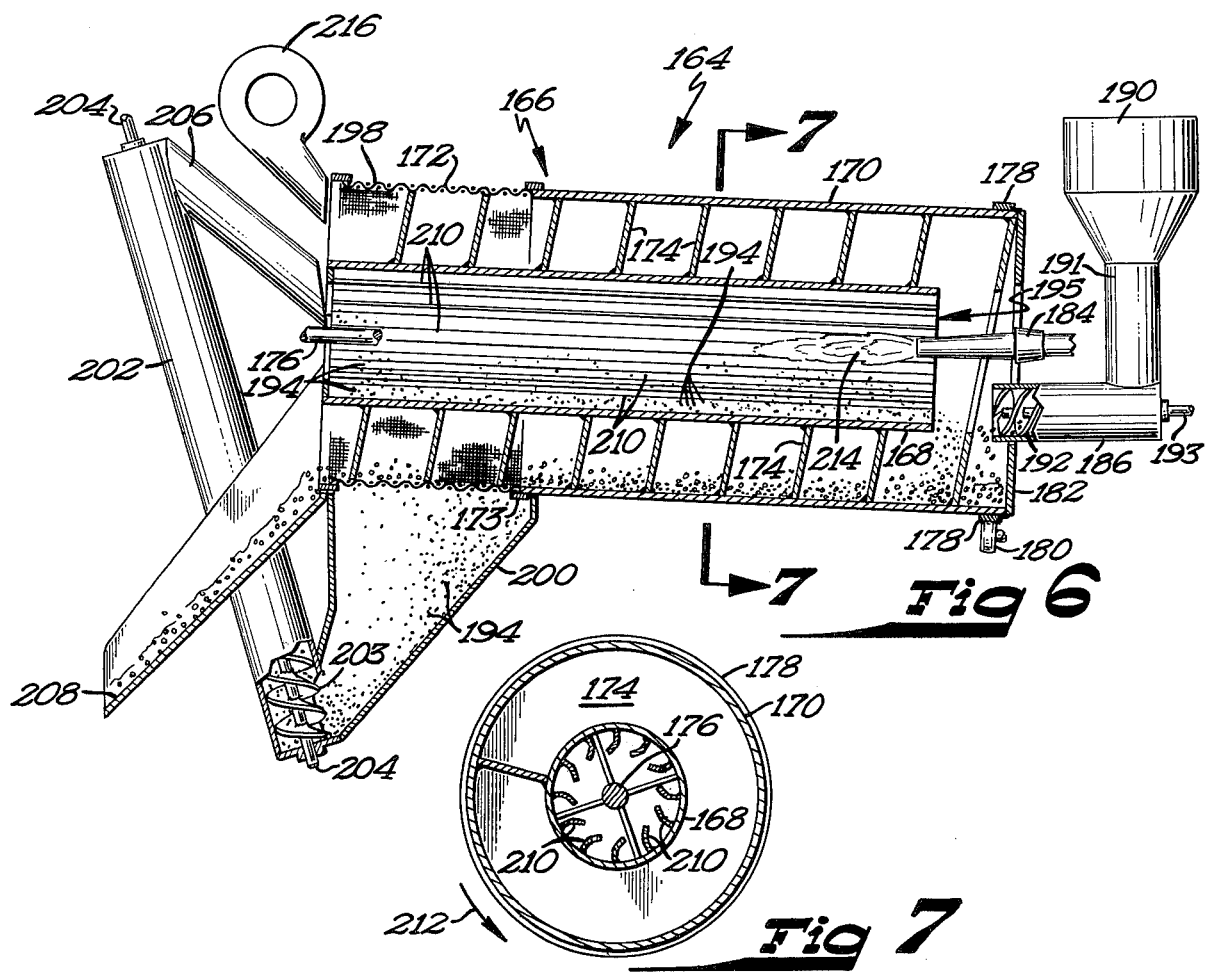

GRANULAR BED ROASTER CONSTRUCTION

BACKGROUND OF THE INVENTION

This invention relates generally to apparatus for heat treating particulate material. More particularly, the instant invention relates to a method and apparatus for cooking, roasting or drying a particulate food product by exposure to a granular bed of heat transferring material.

In the prior art it is well known to treat particulate products by mixing the product with a heated granular material such as salt, sand, metal pellets or the like. Products such as beans, coffee, soybeans, cereal grains, small parts or the like are particularly well adapted for processing through granular bed processes.

In a typical prior art system salt or granular material such as sand or metal pellets are heated and then mixed with the product to be processed, whereupon heat transfer between the granular material and the product will facilitate processing. Typically, a prior art device will include a conveyor means for introducing granular material into a heating chamber, means for introducing the product to be cooked with the granular material into the heating chamber, means for drawing the commingled product through a heating chamber, and of course means for generating heat. Usually a separator is included to separate finished product from granular material, and to return granular material to the input of the heating chamber to repeat the cycle. Examples of prior art constructed in accordance with the aforementioned general guidelines are U.S. Pat. Nos. 2,872,386, issued to O. Aspergen on Feb. 3, 1959; 3,253,533, issued to J. O. Benson on May 31, 1966; and 3,746,546, issued to R. N. Bateson et al. on July 17, 1973. Further known background information appears in the following articles: Raghavan and Harper, "High Temperature Drying Using a Heated Bed of Granular Salt," *Transactions of the A.S.A.E.*, Volume 17, No. 1, Pages 108–111, 1974; Raghavan, Harper, Haberstroh, "Heat Transfer Study Using Granular Media," *Transactions of the A.S.A.E.*, Volume 17, No. 3, Pages 589–592, 1974; and Raghav;an, Harper and Kienholz, "Nutritive Value of Salt Bed Roasted Soybeans for Broiler Chicks," *Poultry Science*, Volume 53, Pages 547–553, 1974.

In prior art food processing devices of the type disclosed in the above-mentioned patents, heating is typically provided through the process of conduction. Bateson U.S. Pat. No. 3,746,546, for example, provides a plurality of spaced apart electric heating bands clamped around a conveyor barrel for heating the barrel and the granular contents thereof. As the outside of the conveyor chamber is elevated in temperature, cooking progresses interiorly thereof as heat is conducted internally to the granular material disposed therewithin. Benson U.S. Pat. No. 3,253,533 utilizes gas heating of the outside of a granular container pan.

While designs of the latter type have functioned adequately under some circumstanes, certain problems relating to thermal efficiency and uniform processing of the product have been apparent. For example, the use of spaced apart conductive heaters is very inefficient where relatively large conveyors are employed. Since the heat transfer area of a tube is relatively small compared to the characteristic volume enclosed thereby, inefficient thermal transfer characteristics would be expected. Moreover, the use of electrical heating bands spaced around a conductive cylinder is not as economical as the use of a direct flame heating system. When, however, direct flame heating of the cylinder body is employed the production of hot spots internally of the heating chamber can result in a burned and hence useless product. In addition, many prior art devices do not expose the product to heat for a uniform time and temperature interval and accordingly some product will be properly processed while other product is inadequately processed.

A similar approach has been employed in nonanalagous prior art for processing hydrocarbons. Examples of related prior art in this area are U.S. Pat. Nos. 1,712,083, issued to H. Koppers, May 7, 1929; 2,441,386, issued to C. Berg, May 11, 1948; 2,420,376, issued to E. Johannson, May 13, 1947; 2,494,695, issued to F. Fisher, Jan. 17, 1950; and 1,899,887, issued to E. Thiele, Feb. 28, 1933. The first three of the above-mentioned references are relevant to the instant invention. Koppers U.S. Pat. No. 1,712,083, for example, mixes material to be heated with previously heated solid balls, and heats the balls in a separate furnace between a pair of spaced apart drums. Berg U.S. Pat. No. 2,441,386 discloses apparatus for separating oil from shale. Spent shale is preheated in a rotary roaster and introduced into a separate rotatable bin with fresh shale to separate and recover the oil therefrom.

SUMMARY OF THE INVENTION

In the present invention a granular heat transfer material such as salt, sand or the like is preferably heated in a separately defined heating bin by a direct flame, which injects heat internally of the heating bin to directly contact the granular material. Heated granular material leaving the heating bin is then conveyed to a roasting bin or chamber where it is commingled with a product to be heated or cooked. As the commingled granular heat transfer material and the product to be heated are passed through the roasting chamber, conduction of heat from the granular material into the product will result in heat processing of the product.

In one form of the invention the roaster bin is positioned in a vertically spaced apart location immediately above the heater bin so that, among other things, heat escaping from the heater bin will rise and increase the thermal efficiency of the roasting process. In another form of the instant invention the heater pin is preferably disposed coaxially internally of the roaster bin in order to promote thermal efficiency. In yet another form of the instant invention the product to be treated and the granular heat transfer material are commingled and heated directly interiorly of a rotatable roasting chamber. In each case internal flighting means are provided for insuring proper heating effects. Additionally, residence time of the product may be varied by altering the inclination of the axis of the roasting bin or by changing the rotational velocity of the bin. Appropriate temperature may be selected for the particular product to be processed.

Thus, an important object of this invention is to provide a granular bed roasting process and apparatus characterized by greatly increased thermal efficiency. It is an important feature of this invention that heating is accomplished by applying heat directly to the granular heat transferring material rather than to the external surface of the bin structure.

The apparatus applies heat directly to the myriad number of granules of heat transfer material in the heater bin. The total surface area of the granules is extremely high, far exceeding the surface area of the heating bin. When the granular material is brought into contact with a product to be heat processed the large total surface area of the granules assures even heat transfer from the granules to the product and reduction of wasted energy. By applying a direct flame to the granules with the granules falling repeatedly through the flame, heat is directly transferred to the granular material, thus eliminating the inefficiencies of traditional heat transfer methods where the flame is applied directly to the outside of a drum or manifold containing granular material, and the transfer of heat to granular material occurs solely by contact with the drum or manifold.

Another object of this invention is to provide a system of the character described ideally adapted for processing or cooking leguminous, grain or other particulate products.

Another object of this invention is to provide a system of the character described characterized by extremely uniform heat transfer, and adapted to avoid the function of hot spots often responsible for burning a treated product.

Still another object of this invention is to provide product heating systems characterized by maximum thermal efficiency.

Another object of this invention is to provide a system of the character described in which mixing of the granular heat transfer material and the product to be treated are enhanced. In the preferred form of this invention small internal mixing flights may be included to continuously agitate and mix particles through the rotating bin to promote mixing and/or heating thereof.

These and other objects and advantages of this invention will appear or become apparent in the course of the following detailed description.

BRIEF DESCRIPTION OF THE DRAWINGS

In the following drawings, which form a part of the specification and are to be construed in conjunction therewith, and in which like reference numerals have been employed throughout to indicate like parts in the various views:

FIG. 1 is a perspective view of a preferred embodiment of a granular bed roaster constructed in accordance with the teachings of this invention, with parts thereof shown in section or broken away for clarity;

FIG. 2 is a vertical, sectional view of the apparatus taken generally through lines 2—2 of FIG. 1;

FIG. 3 is a longitudinal, sectional view of the apparatus shown in FIG. 1 with parts thereof broken away for clarity and wherein the axis of the roaster bin has been inclined slightly;

FIG. 4 is a longitudinal, sectional view of an alternative embodiment of this invention, with parts thereof broken away for clarity;

FIG. 5 is a vertical, sectional view taken generally along line 5—5 of FIG. 4;

FIG. 6 is a longitudinal, sectional view of a third embodiment of the instant invention, with parts thereof broken away for clarity; and FIG. 7 is a vertical, sectional view taken generally through line 7—7 of FIG. 6.

DETAILED DESCRIPTION OF THE DRAWINGS

The granular bed roasting apparatus described herein is adapted to receive an incoming, particulate raw product and to heat it by exposure to a heated bed of granular material. A suitable granular bed may consist of salt, sand, metal or ceramic pellets or any other known granular bedding material. Particles of the incoming raw product will be heated and/or cooked by exposure to the granular heat transferring material with which it will be mixed. Afterwards the granular material will be recycled for repetition of the process.

The granular bed roasting apparatus 10 (FIGS. 1–3) preferably comprises an upright frame 12 which is adapted to be disposed upon a supporting surface such as a floor or the like. The frame may, however, rest upon a conventional trailer whereby the apparatus may be towed to a desired work location. Frame 12 comprises a plurality of rigid, right-angled frame bars 14 which define a plurality of enclosure sides 16. It will be appreciated that the apparatus sides 16 are preferably comprised of spaced apart, parallel metallic sheets 17 and 18 between which thermal insulation material 22 is sandwiched to maximize thermal efficiency of the apparatus and to prevent burns or injury to the equipment operator. The frame 12 provides structural support for a lower, rotatable heating bin 24 adapted to heat granular material and an associated roaster bin 26 in which heating of the raw product by exposure to heated granular material is facilitated.

The heater bin 24 comprises a generally cylindrical, rotatable drum 25 which is rotatably mounted to frame 12 through an axle member 30, which extends coaxially through the bin and through supporting spoke structures 32 disposed therewithin. The spoke structures 32, which are fastened to axle 30, each comprise a plurality of radially spaced apart, circular cross section spokes 34 which are rigidly attached to the helix or auger 102 of the drum 25 as by welding or the like. A forward portion 24a of the heating bin is rotatably supported upon two spaced apart trunions 38. Each of the trunions comprises a pair of rotatable guide wheels 40 which contact an outer, reinforced circumferential edge 42 of heating bin 24 to rotatably support same. Axle 30 extends from the spoke structure 32 and is rotatably received through a bearing in a mounting mandrel 44, mounted on support member 46 (FIG. 3). Axle 30 (and thus drum 25) is driven by a motor 31 through a variable speed unit 35 and coupled to the axle by chain and drive gear assembly 33. As will best be appreciated from FIG. 3, heating bin 24 is preferably mounted at an inclination of approximately one to ten degrees with respect to the horizontal, in order to facilitate passage of granular material from input end 24a thereof to output end 24b thereof in response to bin rotation.

Granular heat transferring material 60 enters the rotatable drum 24 through an input chute 52 and passes through an orifice 53 (FIG. 2) provided in a stationary baffle plate 56. Incoming granular material 50 thus directly enters heating chamber 54 defined internally of rotatable drum 25, where it will be heated to approximately 100° to 1,000° Fahrenheit, depending on the product to be processed.

Lifting flights 58 comprise elongated, rigid members of generally V-shaped or cupped cross section which are parallel with axle 30 and are located at circumferentially spaced apart intervals along the inner periphery of drum 25. The lifting flights are attached internally of drum 25 as by welding or the like. It will be apparent from FIG. 2 that as drum 25 is rotated in the direction of arrow 61, lifting flights 58 will contact and pick up granular material 50 at the bottom of the bin and gradually move the granular material to an upper portion within the bin. As rotation continues, portions of the granular material will be dropped through the interior of the bin towards the bottom thereof, and as the cycle repeats itself in response to rotation of the bin the heated granular material will flow towards drum end 24b in response to gravitational forces due to the inclination of the drum. As the granular material 50 is thus drawn through the bin 24 it will be heated by a preferably gas operated heater 60, which directs heat inwardly into the heating chamber 54 in a countercurrent direction opposite to the direction of travel of the granular material. A less preferred but usable form would be concurrent flow. It will be appreciated that as the granular material is continually moved through the drum 25, it will be repeatedly dropped by the flights 58 through the highest heating zone defined by the high temperature flame and exhaust gases 61 therefrom. The highly heated granular transferring material will then be outputted through the open rear end 24b of the drum, and heated material 50a will drop into a chute 62, which receives an upwardly extending conveyor chute 64 for transferring heated granular material 50a into the upwardly located product heating bin 26. Conveyor 64 comprises an internally disposed rotatable auger 66 driven through a conventional motor 68 via linkage 69.

It is important to note that thermal efficiency has been maximized by positioning the heating means 60 in a countercurrent relationship with respect to the moving granular material 50. Flame 61 may thus directly contact the heated granular material 50. Also, heat escaping from the heating drum 25 will be directed upwardly toward roaster bin 26 by curved baffle 36, thereby heating the upper drum and keeping the exhaust gases from entering upper bin 26.

Product roaster bin 26 is rotatably mounted at an upper location within the frame enclosure. The roaster bin 26 comprises a generally cylindrical drum 70 which is rotatably mounted with respect to the frame 12 by an internal, coaxially disposed axle 72, opposite ends of which are rotatably received within a bearing 74 (FIG. 3) and a mandrel structure 76 respectively. A pair of spaced apart spoke structures 77 disposed internally of the drum 70 structurally support the drum. Each structure 77 comprises a plurality of individual radially outwardly extending round cross section spoke elements 78 which are rigidly attached at circumferentially spaced apart intervals to the inner surface of drum 70 or to the helix 102. Drum 70 extends through heat baffle 36, and is coupled to a particle separator means 80 which is rotatable therewith and positioned over the upper mouth of chute 52. The separator 80 essentially comprises a screen or mesh through which the particles 50 of heat transferring material fall. However, the larger product granules 82 are unable to fall through the separator screen, and exit from the bin 26 through a product output chute 84. The generally ring-shaped flange 86 is provided at the outer end of the separator means 80 to structurally brace same.

The input end 26a of the roaster bin is received through a downwardly angled heat baffle 90 and terminates within a surrounding, circular shroud 92. A downwardly angled chute 94 terminates within the shroud 92 and delivers mixed product and granular heat transferring material directly interiorly of the roaster bin 26. As mentioned earlier, heated granular material outputted from the lower heater bin 24 is transmitted through an auger conveyor 64 which communicates with chute 94.

Raw product to be processed temporarily stored within hopper 96 will be transmitted through a variable speed auger conveyor 97 into a vertically oriented chute 98 which communicates with chute 94. Product disposed within the bin 96 will be transmitted through conveyor 97 in response to actuation of an auger therewithin (not shown) by the variable speed unit and motor 100. Thus a mixture of heated granular material and particles of raw product to be heated will be outputted through chute 94 into bin 70 for heat treating.

An internally disposed auger or helix 102 is preferably included to help draw material through bin 26 in response to rotation thereof and may be fastened to bin 26 in any known manner. In the preferred form of this invention the central axis of the bin 26 is mounted either horizontally or at an incline of approximately 0° to 10° to the horizontal, as shown in FIG. 3, in order to further facilitate passage of materials through the bin in response to normal gravitational forces. A plurality of elongated lifting or mixing flights 104 are also disposed internally of bin 26 to promote agitation and mixing of the product and the heat transferring material. The flights 104, which comprise agitating and mixing means, extend the length of the roaster bin 26a and are located at the inner circumferential edge thereof at radially spaced apart intervals. The flights 104 are of generally rectangular cross section, as best seen in FIG. 2. In response to rotation of the drum 70 the mixture conveyed through the roaster bin will be constantly agitated by the combined action of the auger 102 and small lifting flights 104 disposed between the blades of the auger. In this manner it has been found that the product will not remain in any one spot long enough to be burned, and uniform heating of the product is facilitated. The residence time of the product within the rotatable roaster bin may be adjusted, depending upon the product involved. Residence time may be adjusted through selection of the pitch of auger 102, the spacing between mixing flights 104 or preferably through adjustments to the speed of drive motor 31, which is mechanically linked to axle 72 by chain and drive sprocket combination 110. The drive motor 31 may be provided with a variable speed drive 35. In the preferred embodiment it has bee found desirable to rotate bin 26 at approximately one half the speed of heater bin 24.

In operation granulated product to be heated such as soybeans or the like is first dumped into hopper 96, from whence it will be transmitted through variable speed conveyor 97 and chutes 98 and 94 into the rotatable roaster bin 70. At this time heated granular material 50a at a selected temperature will also be transmitted through conveyor 64 and chute 94, so that the two products will be mixed somewhat when delivered into the mount of bin 26. In response to rotation of the roaster bin, mixed product and heat transfer material will be continuously agitated and drawn therethrough. Exposure of the heat transfer material to the product will facilitate processing of same. Because of the combined effects of drum rotation, the flighting 104, and helix or auger 102 the product will be continuously moved along and agitated so that it will not be burned through overexposure to bin walls. Since bin 26 is not directly heated the temperature of the bin tends to remain uniform throughout, thereby obviating the formation of hot spots. In this regard thermal efficiency of the apparatus 10 is improved through the surrounding heat insulative material 16, and by the heat baffles 36 and 90 which direct heat escaping from lower bin 24 towards the upper bin 26. Vent 101 outputs product of combustion to the atmosphere, and vent 103 vents moisture or other gases escaping from the separator means.

Treated product 82 may be gathered at the mouth of output chute 84, whereas the heat transfer material outputted through separator means 80 will be returned into the roaster bin 24 through chute 52. The rotation of inclined bin 24 will draw the granular material through the bin and the flights 58 therewithin will continuously drop the material through the flame 61 provided by heating means 60. Heated granular material 50a outputted from the bin 24 will then be conveyed back into the roaster bin in the manner previously described. It will thus be apparent that the granular heat transfer material necessary for the heating process will be continuously recycled between the upper and lower bins, so that an extra source or input of heat transfer material is unnecessary.

An alternative embodiment of a granular bed roaster apparatus 120 is shown in FIGS. 4 and 5. This embodiment is ideal for use where products of combustion will not be a deleterious factor. Roaster 120 comprises an elongated, generally cylindrical drum structure 122 which is rotatably mounted and connected with a motor 125, gear 125a at the circumference of drum structure 122 being drivingly engaged with a spur gear on the shaft of motor 125. Of course any rotational drive means could be successfully employed.

The drum structure 122 actually comprises a cylindrical product roaster drum 124 which is mechanically coupled to a separator drum 126 through a flange coupling 127. The separator means 126 comprises a cylindrical screen mesh 128 and an internally coaxially disposed heater manifold 130, between which a helical auger 132 is located and wound. An end plate 134 (FIG. 5) closes off the end of manifold 130, and includes an orifice 136 through which the heat injecting end 138 of a heater apparatus 140 is received. Manifold 130 is in the form of a cylindrical drum of substantially smaller diameter than that of drum 124, and provides an internal heating space into which heat or flame 142 may be directed by the heating apparatus 140.

The rotatable roaster bin 124 preferably includes a plurality of elongated, circumferentially spaced apart flighting members 144. Each of the flighting members 144, which are of preferably angle fin or cup-shaped cross section, may be attached to the inner periphery of the drum through welding or the like. The function of the flighting members is to lift material disposed within the roaster bin and to drop it through the central interior of the bin to promote efficient mixing and heating of same, and to promote movement toward flame 142.

Product hopper 146 is adapted to temporarily receive and store incoming product to be treated. Product may be inputted to the hopper 146 through the open upper mouth thereof. Heat transferring granular material is delivered to chute 123 through an upwardly inclined, conventional auger or vertical transport assembly 148. Auger 149 disposed within the conveyor 148 may be driven by rotation of axle member 150 through motor means (not shown) in order to move heat transferring granular material through the chute 123 and into mixing bin 124. Product to be treated will be inputted into conveyor 152, and in response to rotation of the conventional variable speed auger 154 therewithin product will be delivered directly into the interior of rotatable roasting bin 124, whereupon heated granular material and product are mixed.

Products will primarily be heat treated within bin 124 by exposure to the heat transferring material therewithin and from heat provided by flame 142. As the cylindrical section 122 rotates, the lifting flights 144 will continually pick up the mixture and drop it through the center of the bin in order to facilitate direct heating thereof by heater 140. In this regard it should be noted that the apparatus 120 is preferably mounted at a slight incline of approximately one to ten degrees so that with gravitational forces the mixed material will be drawn through and out the drum structure 122. The speed of drum rotation and the angle of inclination from the horizontal of the drum determine the residence time of product moving through the drum. Although the mixed material dropping through bin 124 in the area of manifold mouth 156 will be directly exposed to heat, burning or charring of the product will be prevented since exposure to flame 142 will be severely limited in time and buffered by the granular material. The mixed contents of bin 124 flow into the separator means 126 by gravity and also by the lifting, sliding and rolling action caused by the inclined drum and its internal lifting flights. Granular heat transferring material will be filtered through screen 128, dropping into a lower collector hopper 158 and from thence back into conveyor 148 for repetition of the process. It will thus be apparent that the granular heat transferring material will be continuously recycled. The treated product will then drop through an opening at the right of the separator 126 into an output chute 160 where it will be available for further processing or packing or used directly after proper cooling.

While not expressly shown as having an outer insulative housing, it should be understood that the embodiments of FIGS. 4–7 would be provided with an outer insulative housing 16 as was the case with the apparatus of FIGS. 1–3.

An alternative embodiment of a granular bed roaster apparatus is depicted in FIGS. 6 and 7. The roaster 164 comprises a rotatable drum section 166 in which a smaller diameter heater bin 168 is coaxially disposed and rotated in a direction 212.

The rotatable drum 166 comprises a cylindrical roaster bin 170 and a cylindrical separator means 172 which is attached thereto with a coupling band 173. An internal auger 174 wound between rotatable drum section 166 and heater bin 168 provides support for bin 168 and rigidly maintains it in a coaxial position internally of the apparatus. A centrally defined axle member 176 disposed within heater bin 168 and supported therewithin through a spoke assembly (not shown) provides support for the drum section 166 and enables it to be rotated through conventional motor means (not shown). At the right side (as viewed in FIG. 6) of product roaster bin 170 a circular guide track 178 is provided to bear against rotatable trunion wheel 180 for rotatable, mechanical support. As best viewed in FIG. 6, the drum section 166 has a selectively variable incline so as to facilitate gravitational movement of granular material through heater bin 168. A stationary, circular end plate 182 bears closely against the end of roaster bin 170 and provides mechanical support for a centered heating means 184 and a product input conveyor 186.

Product to be treated received within product hopper 190 drops through a chute section 191 thereof into input conveyor 186 from whence it will be forced into bin 170 through a conventional variable speed rotatable auger 192 driven by mechanical rotation of axle 193. At the same time heated granular material 194, which may comprise sand, salt, metal pellets, ceramics or the like, will be dropping out of the output end 195 of heater bin 168 and falling into a lower portion of the roaster bin 170, thereby being commingled or mixed with incoming product. In response to rotation, auger 174 will draw the commingled product and heat transferring granular material through the apparatus, during which time the product will be treated by exposure to the heated granular material. The commingled product and granular material will move toward the left (as viewed in FIG. 6) and be delivered into separator means 172. The separator includes a cylindrical screen section 198, through which the granular heat transferring material will pass, dropping into a return chute 200 which communicates with an upwardly inclined conveyor 202. An auger 203, which may be driven by mechanical rotation of axle 204, for example, will lift granular material up into chute 206, which will return it into the heater bin 168. Treated product unable to drop through screen mesh 198 will be outputted from the separator means 171 into an output chute 208.

Granular heat transferring material will thus be continuously recycled between heater bin 168 and product roaster bin 170. The material entering heater bin 168 from chute 206 will be continuously agitated and picked up by a plurality of elongated flighting segments 210 which are disposed at circumferentially spaced apart intervals about the inner circumference of drum 168. As viewed in FIG. 7, the flighting members are of V-shaped or cupped cross section, and they are adapted to contact granular material at the bottom of the chamber. The material will thus be continuously picked up and dropped through the highest heating zone within the heater bin 168. The heater means 184, which may comprise a gas operated, temperature controllable heater, injects heat or flame 214 directly into the center area of the heater bin 168 in a direction preferably countercurrent to the flow of granular heat transferring material therewithin. Thus the heat transferring material 194 existing from bin 168 will be uniformly heated to a temperature appropriate to facilitate processing of the incoming product. Temperatures of approximately 100° to 1,000° F. are contemplated. Vapors or other products of combustion may be removed from the drum section 166 by a motor-driven vapor removal fan 216 or by a venting manifold as desired. It will be apparent that granular bed roaster 164 thus heats granular heat transferring material within a separate rotatable chamber an yet maintains extemely desirable thermal efficiency characteristics.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A granular bed roasting apparatus usable with heat transferring granular material for heating a product, said apparatus comprising:
   a rotatable granular material heating bin adapted to contain only heat transferring granular material, said heating bin comprising an internally defined granular material heating chamber and a plurality of granular material lifting flights disposed within said heating chamber and extending inwardly therefrom from said bin a predetermined distance for continuously picking up and dropping granular material through said granular material heating chamber in response to rotation of said bin;
   heating means associated with said heating bin for directly heating the interior of said heating chamber and applied directly to granular heat transfer material dropped by said lifting flights and falling within said chamber;
   a rotatable product roaster bin separate from said heater bin for heating a product;
   means for inputting heated granular material outputted from said heating bin into said roaster bin;
   means for inputting a raw product to be heated by said apparatus into said roaster bin thereby commingling said product with said granular heat transfer material;
   separation means adapted to receive material outputted from said product roaster bin for separating granular heat transfer material from product;
   recycling means for returning and inputting granular materials separated from product to said rotatable heating bin; and
   means for controllably rotating said heating bin and said roaster bin.

2. The combination as defined in claim 1 wherein said roaster bin has an inner surface and further comprises agitating and mixing means positioned on said surface of said roaster bin for agitating granular material and product to thereby facilitate commingling thereof, said agitating and mixing means including a plurality of internally disposed, circumferentially spaced apart mixing flights extending inwardly from said roasting bin surface a distance substantially less than the distance which said lifting flights extend inwardly from said heating bin so that said mixing flights agitate and turn over the product and granular material while permitting it to remain on the surface of the roaster bin to avoid free dropping and bouncing of the product as it moves within the roaster bin.

3. A granular bed roasting apparatus usable with heat transferring granular material for heating a product, said apparatus comprising:
   a rotatable heting bin adapted to contain heat transferring granular material, said heating bin comprising an internally defined heating chamber and a plurality of lifting flights disposed within said heating chamber for continuously picking up and dropping granular material through said heating chamber in response to rotation of said heating bin;
   heating means associated with said heating bin to inject heat directly within the interior of said heating chamber, so as to heat directly the granular material disposed therein as it is dropped from said lifters and falling within said chamber;
   a rotatable product roaster bin for heating a product;
   one of said bins being positioned interiorly of the other said bin for rotation together and being constructed and positioned to permit discharge of granular heat transfer material from said interior bin outwardly to said exterior bin;

separation means adapted to receive product and granular heat transfer material outputted from said product roaster bin and separate the granular heat transfer material from the product;

means for inputting a raw product to be heated by said apparatus into said roaster bin to commingle the product with the granular heat transfer material;

means for receiving granular material from said separation means and returning such granular material to said rotatable heating bin; and means for controllably rotating said heating bin and said roaster bin.

4. The combination as defined in claim 3 and further including an auger extending between said roaster bin and said heating bin and along said heating bin for moving the product and granular material along said roaster bin and for agitating said granular material and said product to thereby facilitate commingling therebetween.

5. A granular bed roasting apparatus usable with heat transferring granular material for heating a product, said apparatus comprising:

a first rotatable heating bin adapted to contain heat transferring granular material, said heating bin comprising an internally defined heating chamber and a plurality of lifting flights disposed within said heating chamber for continuously picking up and dropping granular material through said heating chamber in response to rotation of said first heating bin;

a second rotatable bin;

heating means associated with said first bin for directly heating the interior of such bin so as to heat granular material disposed therein as it is dropped from said lifting flights and is falling within said chamber;

one of said bins being positioned interiorly of the other said bin for rotation together and being constructed and positioned to permit discharge of granular heat transfer material from one of said bins to the other of said bins;

separation means adapted to receive product and granular heat transfer material outputted from one of said bins and separate the granular heat transfer material from the product;

means for inputting a raw product to be heated by said apparatus into one of said bins to commingle the product with the granular heat transfer material;

means for receiving granular material from said separation means and returning such granular material to one of said bins; and means for controllably rotating said heating bin and said roaster bin.

6. A granular bed roasting apparatus usable with heat transferring granular material for heating a product, said apparatus comprising:

a rotatable heating bin adapted to contain heat transferring granular material, said heating bin comprising an internally defined heating chamber and a plurality of lifting flights disposed within said heating chamber for continuously picking up and dropping granular material through said heating chamber in response to rotation of said bin;

heating means associated with said heating bin for directly heating the interior of said heating chamber, thereby heating granular heat transfer material disposed therewithin as the granular material is dropped by said lifting flights and is falling within said chamber;

a rotatable product roaster bin for heating a product;

means for transferring heated granular material from one of said bins to the other of said bins;

means for inputting a raw product into one of said bins so as to commingle the raw product with the granular heat transfer material;

separation means communicating with one of said bins to receive material outputted from one of said bins to separate the granular heat transfer material from the product;

means for transferring granular material from said separation means to one of said heating bins; and means for controllably rotating said heating bin and said roaster bin.

7. In combination with a quantity of heat transferring granular material, a granular bed roasting apparatus for heating a product, said apparatus comprising:

a rotatable granular material heating bin adapted to contain said granular material, said heating bin comprising an internally defined granular material heating chamber and a plurality of lifting flights disposed within said heating chamber for continuously picking up and dropping granular material through said heating chamber in response to rotation of said bin;

heating means, including a flame directed within said heating chamber and positioned so that granular material dropped by said lifting flights falls directly through said flame so as to transfer heat directly from said flame to said granular material;

a rotatable product roaster bin for heating a product;

means for transferring said granular material from one of said bins to the other of said bins;

means for inputting a raw product to be heated by said apparatus into one of said bins so as to commingle the product with said granular heat transfer material;

separation means adapted to receive granular material and product outputted from one of said bins for separating said granular material from the product;

recycling means for returning and inputting granular material from said separation means to one of said bins; and means for controllably rotating said heating bin and said roaster bin.

* * * * *